Sept. 3, 1940.  M. H. ROWE  2,213,534
APPARATUS FOR DETERMINING LIGHT ABSORPTION QUALITIES OF SUBSTANCES
Filed April 2, 1938
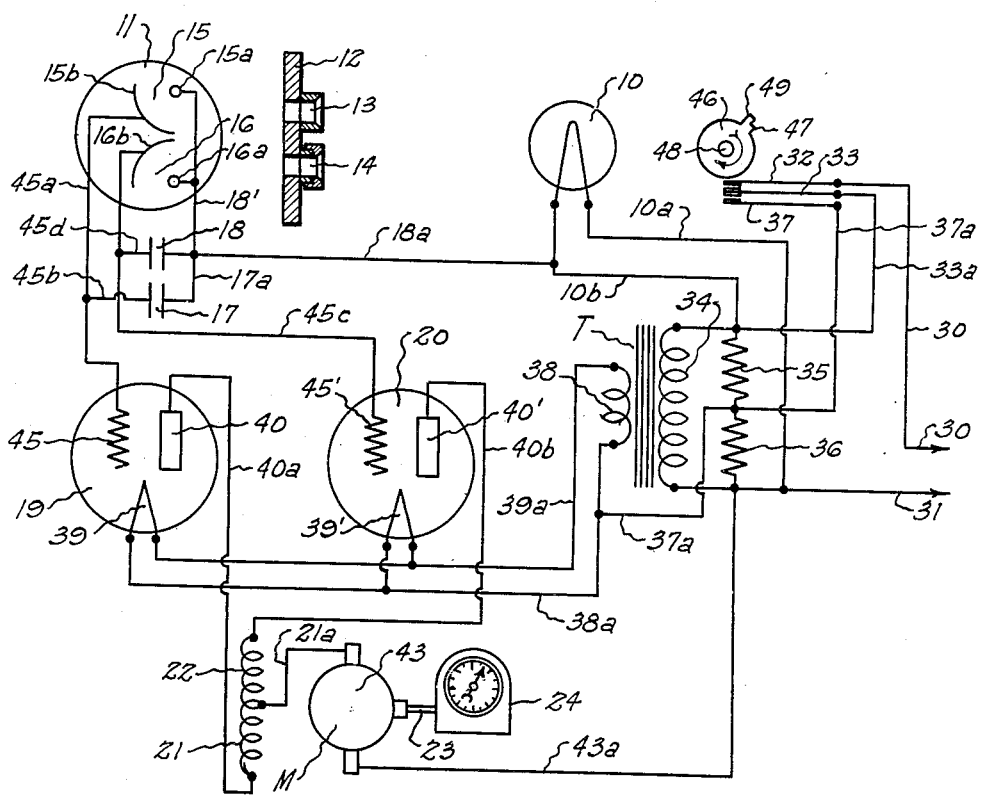

Patented Sept. 3, 1940

2,213,534

UNITED STATES PATENT OFFICE 2,213,534

APPARATUS FOR DETERMINING LIGHT ABSORPTION QUALITIES OF SUBSTANCES

Marion H. Rowe, Dallas, Tex., assignor of one-half to Joseph H. Reynolds, Cisco, Tex.

Application April 2, 1938, Serial No. 199,564

6 Claims. (Cl. 250—41.5)

This invention relates to new and useful improvements in apparatus for determining the light absorption qualities of different substances.

One object of the invention is to provide an improved apparatus for determining the relative light absorption qualities of two different media and utilizing the relative differences to operate an indicator, valve or other mechanism, the device being particularly adapted for use in testing a chemically treated liquid to determine the amount of chemical therein.

An important object of the invention is to provide an improved apparatus wherein light rays are directed through different substances or materials whereby the rays are absorbed in proportion to the light absorption qualities of the materials, together with electrical means actuated by the rays passing through the substances being tested for operating an indicator, or other mechanism, in accordance with the relative differences between the tested substances.

A particular object of the invention is to provide an improved electrical apparatus wherein a twin photoelectric cell, or two photoelectric cells, is employed to control the discharge of condensers, which in turn, control the flow of current through gaseous triode tubes connected in a motor circuit, whereby the motor is operated by the light rays striking the photoelectric cells and in accordance therewith.

A further object of the invention is to provide an improved wiring diagram whereby light rays may be utilized to operate an electric cell and having means for automatically and periodically actuating the apparatus.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a wiring diagram of an apparatus constructed in accordance with the invention, Figure 2 is a face view of the openings through which the light rays are directed, Figure 3 is a similar view showing the adjustability of one of said openings, and Figures 4 and 5 are schematic views of the automatic switch closing cam which controls the operation of the apparatus.

In the drawing, the numeral 10 designates an incandescent lamp or bulb located so as to direct light rays onto a twin photo tube 11, which is spaced some distance from the lamp. A partition or wall 12 is interposed between the lamp and tube 11 and this wall has a pair of openings 13 and 14 formed therein. The opening 13 is of a fixed size, while the opening 14 is adjustable so that it may be increased or decreased in diameter. The photo tube includes a pair of photoelectric cells 15 and 16 which are alined with the openings 13 and 14, respectively, in the partition, whereby the light rays passing through these openings are received by the cells. The photoelectric cells are electrically connected to condensers 17 and 18, respectively, and are utilized to discharge said condensers as will be explained.

The condenser 17 is electrically connected to a gaseous triode tube 19, while the condenser 18 is connected to a second triode tube 20, whereby the condensers control the flow of current through the anode-cathode circuits of the tubes. The triode 19 acts to permit a flow of current to one winding 21 of an electric motor M so as to operate the motor shaft 23 in one direction and the other triode 20 permits a flow of current to a second winding 22 of said motor. The winding 22 is opposite to the winding 21, whereby when it is energized, the motor shaft is rotated in an opposite direction. The motor shaft 23 is shown as connected to an indicator 24 and operates the same but it is pointed out that said shaft may be utilized to actuate a valve, or other mechanism.

Electrical current is supplied through electrical supply wires 30 and 31 and these wires may carry the usual 110 volt A. C. The wire 30 is connected to a switch blade 32 which is adapted to engage a switch arm 33 to make electrical connection therewith. The arm 33 is connected by a wire 33a to one side of the primary winding 34 of a transformer T, while the other side of the transformer winding is directly connected to the other side of the circuit which is the wire 31. Voltage divider resistances 35 and 36 are connected across the wires 33a and 31, and the purposes of these resistances will be hereinafter explained. When the switch blade 32 is engaging the switch arm 33, a current is flowing through the wires 30, 33a, primary winding 34, resistances 35 and 36, and the other supply wire 31.

A second switch arm 37 is located below the arm 33 and when the blade 32 is depressed sufficiently, an electrical connection is made between said blade and the two arms therebelow. The arm 37 is connected by a wire 37a to a lead 38a which extends from one side of the low voltage secondary winding 38 of the transformer T. The wire 37a is also connected to the connecting wire between the resistances 35 and 36, as is clearly shown in Figure 1. The lead 38a has its end connected to one side of the cathode 39 of the gaseous triode tube 19 and also to one side of the cathode 39' of the tube 20. The other side of the transformer secondary winding 38 is electrically connected by a wire 39a to the other side of the cathode of said tubes.

The anode 40 of the triode tube 19 is connected by a wire 40a with the winding 21 of motor M, while the anode 40' of the triode tube 20 is connected by a wire 40b with the second winding 22 of said motor. As has been explained, the windings 21 and 22 are oppositely wound and obviously, when one winding is energized the motor shaft 23 is rotated in one direction, while energization of the other winding rotates the shaft in an opposite direction. The windings 21 and 22 are electrically connected through a lead 21a with one side of the armature 43 of the motor and the opposite side of said armature is connected by a wire 43a with the current supply wire 31. Thus, the anodes of the triode tubes 19 and 20 are connected to one side of the current supply through the motor M.

The incandescent lamp or bulb 10 which provides the light rays passing through the openings 13 and 14, is supplied with current through wires 10a and 10b which lead from the current supply wire 31 and the wire 33a respectively. Thus, when the contact blade 32 is depressed to engage the arm 33, the lamp is illuminated.

For connecting the twin photo tube 11 and the condensers 17 and 18 in the electrical circuit, a wire 18a leads from the supply wire 10b and to one side of the condenser 18. A short lead 17a connects the wire 18a to one side of the condenser 17. The wire 18a is also connected by a wire 18' to the anodes 16a and 15a of the photoelectric cells 15 and 16. The cathode 15b of the cell 15 is electrically connected by a wire 45a to the grid 45 of the triode tube 19. A lead 45b extends from the wire 45a to the other side of the condenser 17, whereby the cathode 15b is also connected with the condenser, as well as with the grid. The cathode 16b of the photoelectric cell 16 is connected to the grid 45' of the triode tube 20 by a wire 45c and this cathode is also electrically connected to one side of the condenser 18 by a lead 45d extending from the wire 45c to said condenser. With the above arrangement, the condenser 17 is associated with the grid 45 of the triode tube 19 and also with the cathode 15b of the photoelectric cell 15 while the condenser 18 is associated with the grid 45' of the tube 20, and also with the cathode 16b of the cell 16.

In operation, the light opening 14 is adjusted with relation to the opening 13 so that the light rays passing through both openings and striking the photoelectric cells 15 and 16 are such that the cells will discharge the condensers simultaneously. The substance or material which is to be tested for its light absorption qualities is then placed in front of one of the openings so that when the lamp 10 is lighted, the light rays passing through one of the openings and striking one of the photoelectric cells, must pass through the material or substance to be tested. The other opening is unobstructed whereby the full amount of light rays will strike its respective cell.

When the test is to be made, the switch blade 32 is engaged with the switch arm 33 to close an electrical circuit therebetween. This may be done manually, but it is preferable to employ a cam disk 46 (Figures 4 and 5) having a projection 47 thereon. This disk may be mounted on a shaft 48 which is rotated by a clock mechanism (not shown) or other means, whereby the blade 32 and arm 33 will be engaged at regular intervals and the test accomplished automatically.

When the cam disk 46 rotates sufficiently for the projection 47 to strike the blade 32, said blade is moved downwardly to engage the arm 33. Such engagement causes the lamp 10 to be illuminated and the transformer T to be energized. At the same time the cathodes 39 and 39' of the triode tubes 19 and 20 gradually reach operating temperature. As this occurs, negative charges are built up on the grids 45 and 45' of the tubes, across the condensers by the diode rectifying action of the cathode grid circuit of the triode tubes. The electrical circuit at this time is from the supply wire 30, through blade 32 and arm 33, wires 33a, 10b, and 10a, condensers 17 and 18 and to the photo tube 11. From the condensers the current flows through wires 45a and 45c to the grids 45 and 45' of the triode tubes and then from the grids to the cathodes 19 and 19'. The cathodes are connected through the wires 38a and 39a to the other supply wire 31 to complete the circuit.

As has been stated, the flow of current in this manner builds up negative charges on the grids 45 and 45' due to the diode rectifying action of the cathode grid circuit of the tubes 19 and 20. This action prevents flow of current in the cathode-anode circuit of said tubes 19 and 20 and thus, the condensers 17 and 18 are charged. The projection 47 on the cam disk 46 holds the blade 32 and arm 33 in engagement for a sufficient length of time to permit the cathodes of the triode tubes to reach operating temperatures and to charge the condensers.

When this condition is reached, an enlarged projection 49 on the cam disk 46 engages the blade 32 and depresses it sufficiently so that electrical connection is made between the blade and both arms 33 and 37 therebeneath (Figure 5). This movement of the blade causes the full voltage of the supply to be impressed across the anode-cathode circuit of the triode tubes 19 and 20, the flow being through the wire 30, blade 32, arms 33 and 37, wire 37a and to the cathodes 39 and 39'. The anodes 40 and 40' are connected to the other side of the supply circuit which is the wire 31 through the motor M. The impression of the full voltage of the supply across the anode-cathode circuit of the triode tubes leaves the grids 45 and 45' charged only by the charges across the condensers 17 and 18 respectively. These charges have been made sufficiently negative by the proper selection of the resistances 35 and 36, to effectively block the flow of current in the anode-cathode circuit of the triode tubes.

Light rays striking the photoelectric cells 15 and 16 progressively discharge the condensers 17 and 18 respectively, until current starts flowing in the anode-cathode circuit of the triode tubes. The greater the amount of light striking the cells, the more quickly discharges of the condensers will occur. As soon as one condenser is discharged to a critical value, a current flow in the anode-cathode circuit of the tubes to which it is connected is permitted, and when such current flow occurs, the motor winding to which said triode tube is connected, is energized to rotate the motor shaft 23 in one direction. Such rotation of the motor shaft operates the indicator 24 so as to move the indicating pointer away from the zero position. The pointer continues to move with relation to the dial so long as the shaft 23 continues to rotate in this direction. As soon as the second condenser discharges, the flow of current through the anode-cathode circuit of the second triode tube energizes its motor winding and a balance in the motor is obtained to halt rotation of the shaft 23. Thus, the motor shaft controls the indication as shown by the pointer and the rotation of said shaft is controlled in accordance with the discharging of the condensers. The discharging of the condensers is, in turn, controlled by the amount of light striking the photoelectric cells 15 and 16.

Assuming that the material or substance to be tested for its light absorption qualities is placed in front of the opening 14, it will be manifest that the light passing through the opening 13 and striking the photoelectric cell 15 is always the same. The amount of light passing through the opening 14 and through the material being tested is, of course, controlled by the light absorption qualities of said material and the amount of light rays striking the photoelectric cell 16 will always be less than the light rays striking the cell 15. Therefore, the condenser 17 which is connected to the cathode of the cell 15 will be discharged first and a flow of current will occur through the triode tube 19 before a flow of current will occur through the anode-cathode circuit of the tube 20. Therefore, the indicator will be operated to move the pointer in a clockwise direction, the amount of such movement being dependent upon the time it takes for the second triode tube 20 to be operated so as to excite its field winding 22 and stop rotation of the motor shaft. From the foregoing, it will be seen that any material or substance may be tested for its light absorption qualities and such qualities can be accurately indicated by the pointer of the indicator 24. By making the opening 14 adjustable with relation to the opening 13, it is possible to accurately adjust the device before the test is made, that is, with no material before either opening, the opening 14 may be so adjusted that the condensers 17 and 18 will be discharged simultaneously to permit a flow of current through the anode-cathode circuits of both triodes at the same instant, with the result that no rotation of the motor shaft 23 will be had. This is true because both windings 21 and 22 will be energized simultaneously and the motor M will not be operated due to the cancelling of field excitation. The initial adjustment of the apparatus in this manner compensates for any slight differences in the manufacturing of the cells 15 and 16, or other parts, so that an accurate test is assured.

Although the device has been described as testing the light absorbing qualities of one material or substance, it is manifest that it would be possible to obtain the relative differences between two materials as to their light absorbing qualities, by placing one of the materials in front of the opening 13 and the other material in front of the opening 14. The relative difference in light absorption quality would thus be indicated because that substance which would permit more light to strike its respective cell, would operate the motor shaft in a given direction. The shaft would be operated until such time as the other cell received sufficient light to discharge its condenser and stop the operation of the motor. By observing the indicator, the operator may readily determine the relative difference in the light absorption qualities of the two materials or substances. Although the device has been described as operating an indicator, it is evident that it can be utilized to operate a valve for controlling the introduction of a chemical into water, or for other purposes and it is to be specifically understood that the apparatus may be applied for controlling and operating other mechanisms.

The gaseous triode tubes 19 and 20 may be purchased on the open market and each is identified as an "R. C. A. tube, #885." They are particularly adapted for the purpose herein as they act with a trigger or instant action. So long as there is a negative grid voltage above a certain critical value there is no current flow through the anode-cathode circuit of the tubes; however, as soon as the voltage drops below this critical value, the flow of current begins instantaneously.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An electrical circuit for a testing apparatus including, a pair of photoelectric cells, an electric motor having a pair of oppositely wound field windings for operating the motor shaft in opposite directions when energized, an electronic tube electrically connected to one of said windings to control the flow of current thereto, a second electronic tube electrically connected with the other field winding so as to control flow of current thereto, means for supplying electrical current to the tubes, an electrical connection between one of the photoelectric cells and one of the tubes, a condenser interposed in such connection and when charged acting to prevent flow of current through the tube, a second electrical connection between the second photoelectric cell and said second tube, a condenser in said second connection and when charged acting to prevent flow of current through the second tube, means for charging the condensers, and means for directing light rays onto the cells to discharge the condensers, whereby a flow of current through the tubes is permitted to energize the motor windings.

2. An electrical circuit for a testing apparatus including, a pair of photoelectric cells, a pair of triode tubes, each having its anode-cathode circuit connected to a prime mover to operate said prime mover, means for conducting electrical current to the tubes, a condenser electrically connected with the grid of one of the tubes and also electrically connected to one of the photoelectric cells, a second condenser electrically connected with the grid of the second tube and with the second photoelectric cell, means for charging said condensers to prevent a flow of current through the anode-cathode circuits of the tubes, and means for directing light rays from the light source onto the photoelectric cells to discharge the condensers to permit a flow of current through the tubes to the prime mover.

3. An operating mechanism for a testing apparatus including, a light source, a pair of photoelectric cells spaced from the light source, a partition between the light source and cells and having a pair of openings alined with the cells so as to direct an equal amount of light rays on each cell, an electric motor having a pair of oppositely wound field windings for operating the motor shaft, a triode tube having its anode-cathode circuit connected with one of said windings, a second triode tube having its anode-cathode circuit connected with the second winding, a condenser connected with the grid of the first-mentioned tube and also electrically connected with one of the photoelectric cells, a second condenser electrically connected with the second tube and the second photoelectric cell, and means for charging the condensers to prevent a flow of current through the anode-cathode circuits of the triode tubes, the light rays striking said cells serving to discharge the condensers and allow the current to flow through the anode-cathode circuits of the tubes and to the windings of the motors, said windings being energized in accordance with the amount of light striking the cells.

4. An electrical circuit for a testing apparatus including, a photoelectric cell, a condenser electrically connected to said cell, a triode tube electrically connected to said condenser, a second photoelectric cell, a second condenser electrically connected thereto, a second triode tube electrically connected with the second condenser, a motor having a pair of oppositely wound field windings for operating the motor shaft, each winding being electrically connected with one of the tubes, means for building up a negative charge across the condensers so as to prevent a current flow through the anode cathode circuit of the tubes, and means for discharging said condensers by means of light rays striking the cells connected to the condensers, whereby a flow of current through the anode-cathode circuit of each tube occurs to energize the motor winding connected thereto when its respective condenser is sufficiently discharged.

5. An electrical circuit for a testing apparatus including, a photoelectric cell, a condenser electrically connected to said cell, a triode tube electrically connected to said condenser, a second photoelectric cell, a second condenser electrically connected thereto, a second triode tube electrically connected with the second condenser, a motor having a pair of oppositely wound field windings for operating the motor shaft, each winding being electrically connected with one of the tubes, means for building up a negative charge across the condensers so as to prevent a current flow through the anode-cathode circuit of the tubes, and means for directing an equal amount of light rays onto the cells so that the condensers are discharged simultaneously to permit a simultaneous flow of current through the anode-cathode circuits of the tubes, whereby the motor windings are energized simultaneously.

6. An electrical circuit for a testing apparatus including, a photoelectric cell, a condenser electrically connected to said cell, a triode tube electrically connected to said condenser, a second photoelectric cell, a second condenser electrically connected thereto, a second triode tube electrically connected with the second condenser, a motor having a pair of oppositely wound field windings for operating the motor shaft, each winding being electrically connected with one of the tubes, means for building up a negative charge across the condensers so as to prevent a current flow through the anode-cathode circuit of the tubes, means for discharging said condensers by means of light rays striking the cells connected to the condensers, whereby a flow of current through the anode-cathode circuit of each tube occurs to energize the motor winding connected thereto when its respective condenser is sufficiently discharged, and an indicator actuated by the motor shaft for indicating the discharging of the condensers with relation to each other to indicate the relative amount of light rays striking each cell.

MARION H. ROWE.